United States Patent [19]
Lindholm et al.

[11] Patent Number: 5,797,004
[45] Date of Patent: Aug. 18, 1998

[54] SYSTEM AND METHOD FOR CACHING AND ALLOCATING THREAD SYNCHRONIZATION CONSTRUCTS

[75] Inventors: Timothy G. Lindholm, Palo Alto, Calif.; Jonathan Payne, Seattle, Wash.

[73] Assignee: Sun Microsystems, Inc., Mountain View, Calif.

[21] Appl. No.: 569,805

[22] Filed: Dec. 8, 1995

[51] Int. Cl.[6] .................................................. G06F 9/46
[52] U.S. Cl. ........................ 395/674; 395/672; 395/677
[58] Field of Search ................................ 395/674, 725, 395/614, 672, 677; 364/232.1, 254, 254.3

[56] References Cited

U.S. PATENT DOCUMENTS

| | | | |
|---|---|---|---|
| 5,129,083 | 7/1992 | Cutler et al. | 395/614 |
| 5,321,841 | 6/1994 | East et al. | 395/725 |
| 5,598,562 | 1/1997 | Cutler et al. | 395/674 |

*Primary Examiner*—Kevin A. Kriess
*Assistant Examiner*—Majid A. Banankhah
*Attorney, Agent, or Firm*—Gary S. Williams; Flehr Hohbach Test Albritton & Herbert LLP

[57] ABSTRACT

An object synchronization module and corresponding method used in a computer system that includes a plurality of threads of execution and a set of objects that each can only be synchronized with one of the threads at a time. The object synchronization module comprises a cache of synchronization constructs, a free list of un-allocated synchronization constructs, and a cache manager. For each respective thread that seeks synchronization with a respective object, the cache manager allocates a respective synchronization construct in the free list for synchronizing the respective thread with the respective object when none of the synchronization constructs is currently allocated for synchronizing the respective object with any of the threads. However, the respective thread is added to the waiters list of a particular synchronization construct so that the respective thread must wait to synchronize the respective object when the particular synchronization construct is currently allocated for synchronizing the respective object with a particular thread. Furthermore, for each specific thread that seeks de-synchronization with a specific object when a specific synchronization construct of the synchronization constructs is currently allocated for synchronizing the specific thread with the specific object, the cache manager re-allocates the specific synchronization construct for synchronizing a waiting thread of the threads with the specific object when the specific synchronization construct's waiters list contains the waiting thread. The cache manager de-allocates the specific synchronization construct when the specific synchronization construct's waiters list does not contain any waiting threads of the threads.

35 Claims, 3 Drawing Sheets

SYSTEM AND METHOD FOR CACHING AND ALLOCATING THREAD SYNCHRONIZATION CONSTRUCTS

FIELD OF THE INVENTION

The present invention relates generally to systems and methods used in object-oriented multithreaded environments for synchronizing objects with threads of execution. In particular, it relates to an object synchronization module and associated method that use a cache of monitors for synchronizing objects with execution threads in a multithreaded environment.

BACKGROUND OF THE INVENTION

In multiprocessor computer systems, software programs may be executed by threads that are run in parallel on the processors that form the multiprocessor computer system. As a result, a program may be run in parallel on different processors since concurrently running threads may be executing the program simultaneously. Moreover, if a program can be broken down into constituent processes, such computer systems can run the program very quickly since concurrently running threads may execute in parallel the constituent processes. Single processor, multitasking computer systems can also execute multiple threads of execution virtually simultaneously through the use of various resource scheduling mechanisms well known to those skilled in the art of multitasking operating system design.

The programs run on such computer systems may be object-oriented. In other words, the threads executing the programs may invoke methods of objects to perform particular functions. However, because of software and/or hardware constraints in the computer system, only a predefined number of objects may be allowed to implement functions at one time. For example, an object may require access to a shared computer resource, such as an I/O device, that can only handle one access at a time. Thus, since concurrently running threads may concurrently seek to invoke a method of an object, the object must be synchronized with only one thread at a time so that one thread owns and has exclusive use of the object. In other words, access to an object by a thread must be synchronized so that other threads do not have access to the object while it is synchronized with the thread.

In the past, various approaches have been used to synchronize an object with a thread. These include the use of synchronization constructs like mutexes, monitors, and semiphores. However, with such synchronization constructs, both synchronization and de-synchronization must be explicitly declared by the programmer. For example, a mutex must be declared locked to synchronize access to an object with a thread that has obtained the mutex and the mutex must be declared unlocked to release the object from being synchronized with the thread. The problem with this is that a thread may be killed prior to the declared de-synchronization or a programmer may forget to declare de-synchronization at an appropriate point. As a result, the object will not be released from being synchronized with the thread and the computer system may be hung-up.

Moreover, as alluded to earlier, monitors have been used in the past to provide synchronization of objects with threads. Each monitor identifies the thread, if any, that currently is synchronized with the object and any threads that are waiting to synchronize with the object. The monitor may temporarily suspend synchronization of the thread with the object when data needed by a method of the object is not yet available. However, in the computer systems that employ these monitors there is a monitor for every object because it is only known at runtime which objects will actually need to be synchronized. As a result, this approach has the distinct disadvantage of requiring a large amount of memory.

SUMMARY OF THE INVENTION

In summary, the foregoing problems are solved by an object synchronization module and corresponding method used in a multiprocessor or multitasking computer system. The computer system includes at least one processor, a group of threads that are each being executed by one of the processors, and a set of objects that each can only be synchronized with a predefined number of the threads at a time.

The object synchronization module comprises a cache of synchronization constructs, a free list, and a cache manager. The number of the synchronization constructs is less than the number of the objects. Each of the synchronization constructs includes (A) an object identifier, (B) a synchronizers list, and (C) a waiters list. The free list contains each of the synchronization constructs that is not currently allocated.

When a respective thread seeks synchronization with a respective object and none of the monitors is allocated for synchronizing the respective object with any of the threads, the cache manger removes a respective synchronization construct from the free list, allocates the respective synchronization construct to the respective object, and assigns the respective synchronization construct to synchronize the respective thread with the respective object. The cache manager allocates the respective synchronization construct to the respective object by updating the respective synchronization construct's object identifier to identify the respective object. The cache manager assigns the respective synchronization construct to synchronize the respective thread with the respective object by updating the respective synchronization construct's synchronizer list to identify the respective thread.

However, when the respective thread seeks synchronization with the respective object and a particular synchronization construct is allocated to the respective object, the cache manager assigns the particular synchronization construct to also synchronize the respective thread with the respective object if the particular synchronization construct's synchronizers list does not yet include the predefined number of threads that can be synchronized with the object. It does so by adding the respective thread to the particular synchronization construct's synchronizers list. However, if the particular synchronization construct's synchronizers list does already include the predefined number of threads that can be synchronized with the object, the cache manager makes the respective thread wait to synchronize the respective object. The cache manger does so by adding the respective thread to the waiters list of the particular synchronization construct.

Furthermore, when a specific thread seeks de-synchronization with a specific object to which is allocated a specific synchronization construct that has been assigned to synchronize the specific thread with the specific object, there are no other threads synchronized by the specific synchronization construct, and no other threads are waiting to synchronize the specific object, the cache manager de-allocates the specific synchronization construct and returns the specific synchronization construct to the free list.

However, when the specific thread seeks de-synchronization with the specific object and the specific synchronization construct's synchronizers list includes another thread that the specific synchronization construct has been assigned to synchronize with the specific object, the cache manager maintains allocation of the specific synchronization construct to the specific object but assigns the specific synchronization construct to not synchronize the specific thread with the specific object. The cache manager does this by removing the specific thread from the specific synchronization construct's synchronizers list.

In addition, when the specific thread seeks de-synchronization with the specific object and a waiting thread is waiting to synchronize the specific object, the cache manager maintains allocation of the specific synchronization construct to the specific object and assigns the specific synchronization construct to synchronize the waiting thread with the specific object. The cache manager assigns the specific synchronization construct by adding the waiting thread to the specific synchronization construct's synchronizers list.

BRIEF DESCRIPTION OF THE DRAWINGS

The invention will be more readily apparent from the following detailed description and appended claims when taken in conjunction with the drawings, in which:

DETAILED DESCRIPTION OF THE PREFERRED EMBODIMENTS

Figure 1:
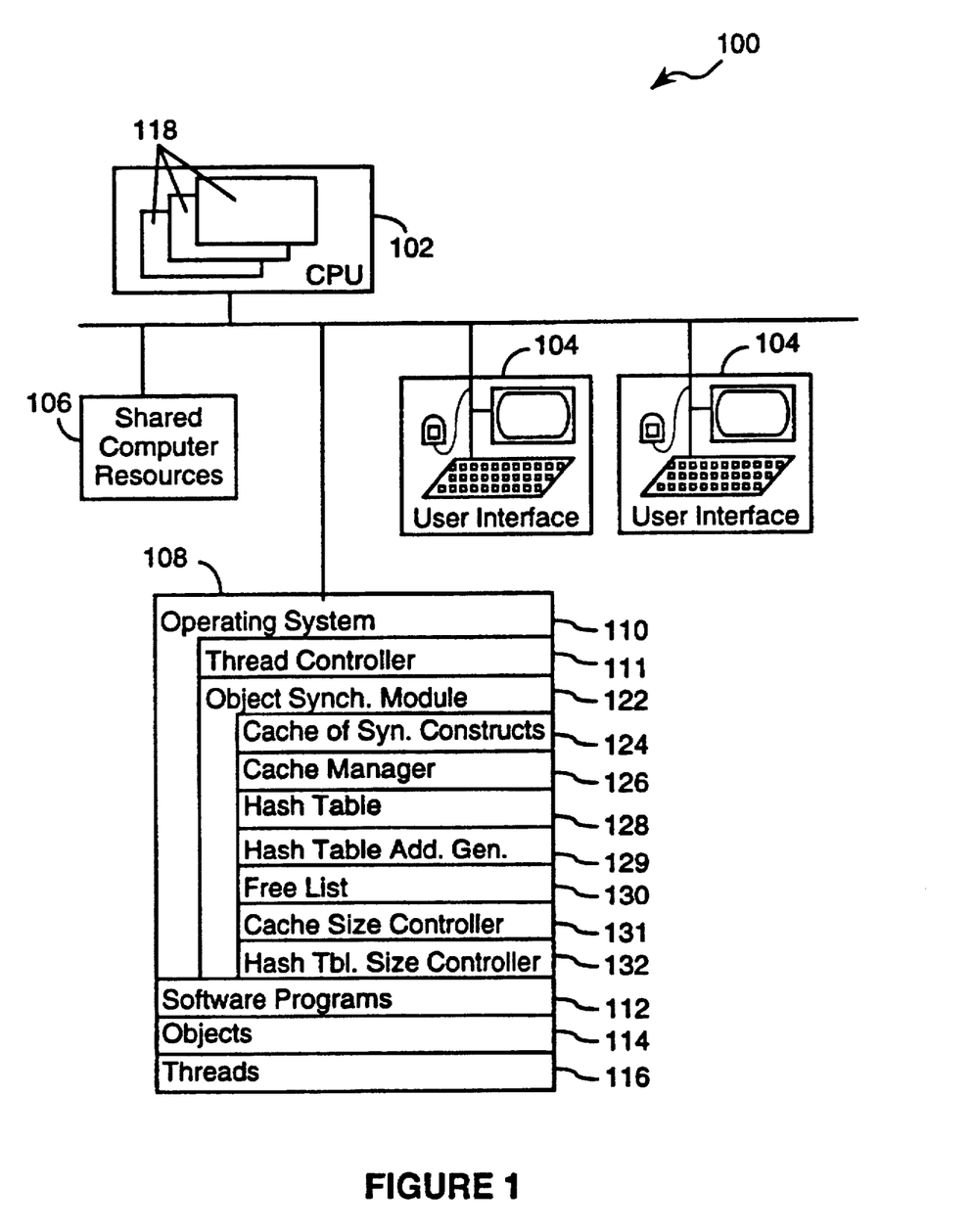
FIG. 1 is a block diagram of a multiprocessor computer system that includes an object synchronization module in accordance with the present invention.

Referring to FIG. 1, there is shown a computer system 100 in accordance with the present invention. It includes a central processing unit (CPU) 102, user interfaces 104, shared computer resources 106, and a memory 108.

The operating system 110 of the computer system 100 is stored in the memory 108 and run by the CPU 102. It controls the computer system's operation and is capable of handling a set of object-oriented multithreaded software programs 112 that are also stored in the memory along with a set of objects 114 that are accessed by the programs. Therefore, when one or more users request execution of one or more of the programs with one or more of the user interfaces 104, a thread controller 111 in the operating system 110 will generate a set of threads 116 in the memory 108 and allocate them to the one or more processors 118 of the CPU to execute the one or more requested programs.

Synchronizing Objects with Threads

Figure 2:
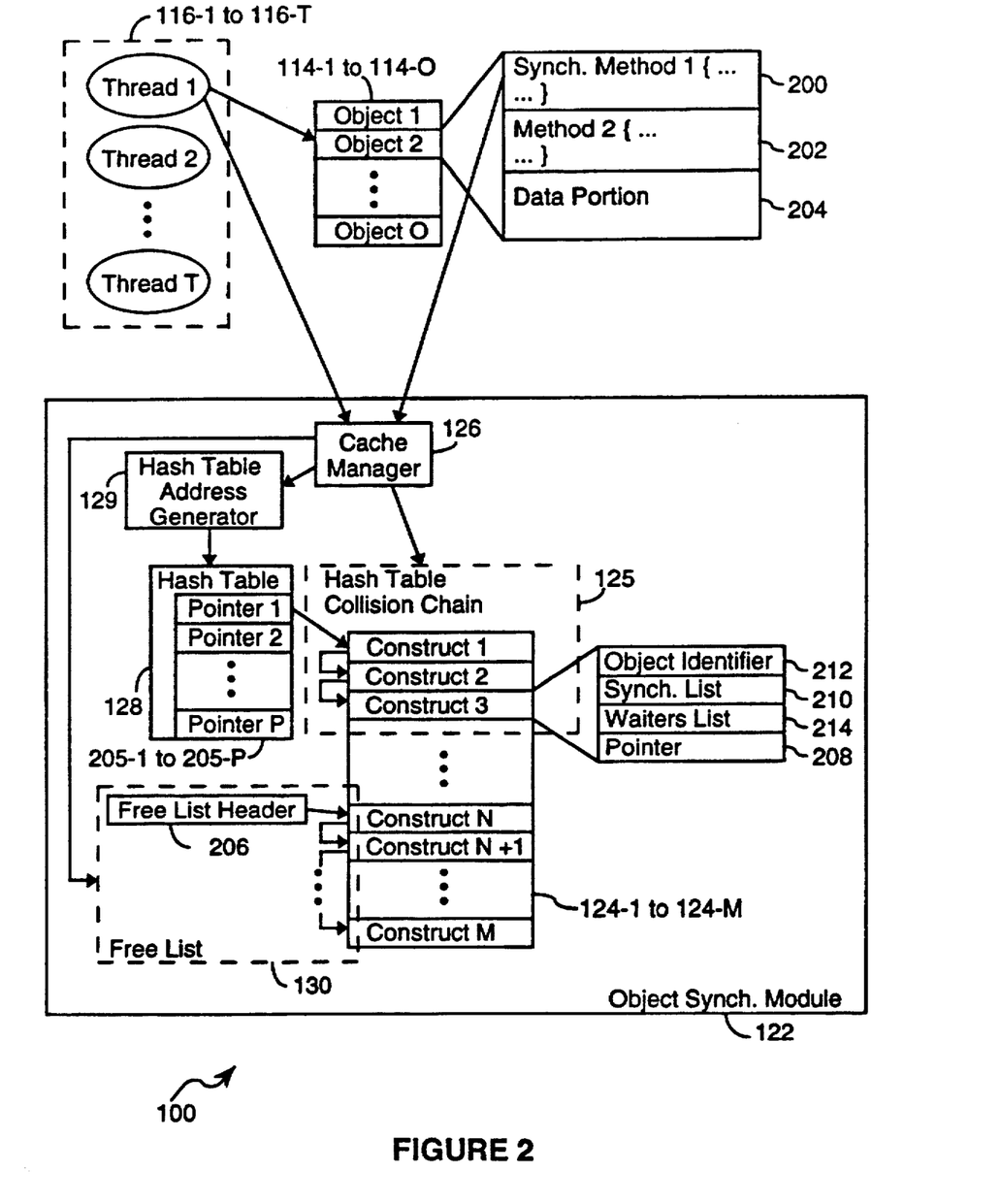
FIG. 2 Is a block diagram of the data structures of the object synchronization module.

Referring to FIGS. 1 and 2, some of the objects 114 include one or more synchronizable methods (i.e., programs) 200 and associated data and data structures in the data portion 204 of the object to implement one or more functions. Referring to FIGS. 1 and 2, these methods may require access to one of the shared resources 106, which can be accessed by only a predefined number (e.g., 1 to N) of threads at a time. Thus, such methods may be explicitly declared synchronized (e.g., synchronized method 1 { ... }) by the object originator (i.e., programmer) so that when one is executed by a thread, the object that contains the method will be synchronized with and owned by that thread until the method is terminated. The objects that contain these kinds of methods are considered synchronizable.

Moreover, some of the objects 114 include one or more methods 202 and associated data and data structures in the data portion 204 that may be executed in parallel by the threads 116. Thus, these methods are not synchronizable and do not need to be declared synchronized (e.g., method 2 { ... }) by the object originator.

Some of the objects 114 may contain both synchronizable and non-synchronizable methods 200 and 202. When one of the threads 116 accesses such a synchronizable object, the object is not synchronized with the thread when any of its non-synchronizable methods is being executed. As a result, it will often be the case that a non-synchronizable method may be executed in parallel by more than one of the threads 116 until one of them seeks to execute one of the object's synchronizable methods. At that point, the object must be synchronized with that thread.

Moreover, in the preferred embodiment, some of the objects 114 may include a method with a section explicitly declared synchronized so that the object that contains the method with the synchronizable section will be synchronized to the corresponding thread when this section is executed. Furthermore, some of the objects may include a method with a call inside to another object or a method of the other object which is explicitly declared synchronized so that the other object will be synchronized with the corresponding thread. Therefore, objects may also be synchronizable in these ways as well. However, for purposes of illustration, only synchronization of an object that includes a method that is declared synchronized will be discussed with respect to the present invention. But, those skilled in the art will recognize that the invention is applicable as well with objects that are synchronized in the other ways just discussed.

Figure 3:
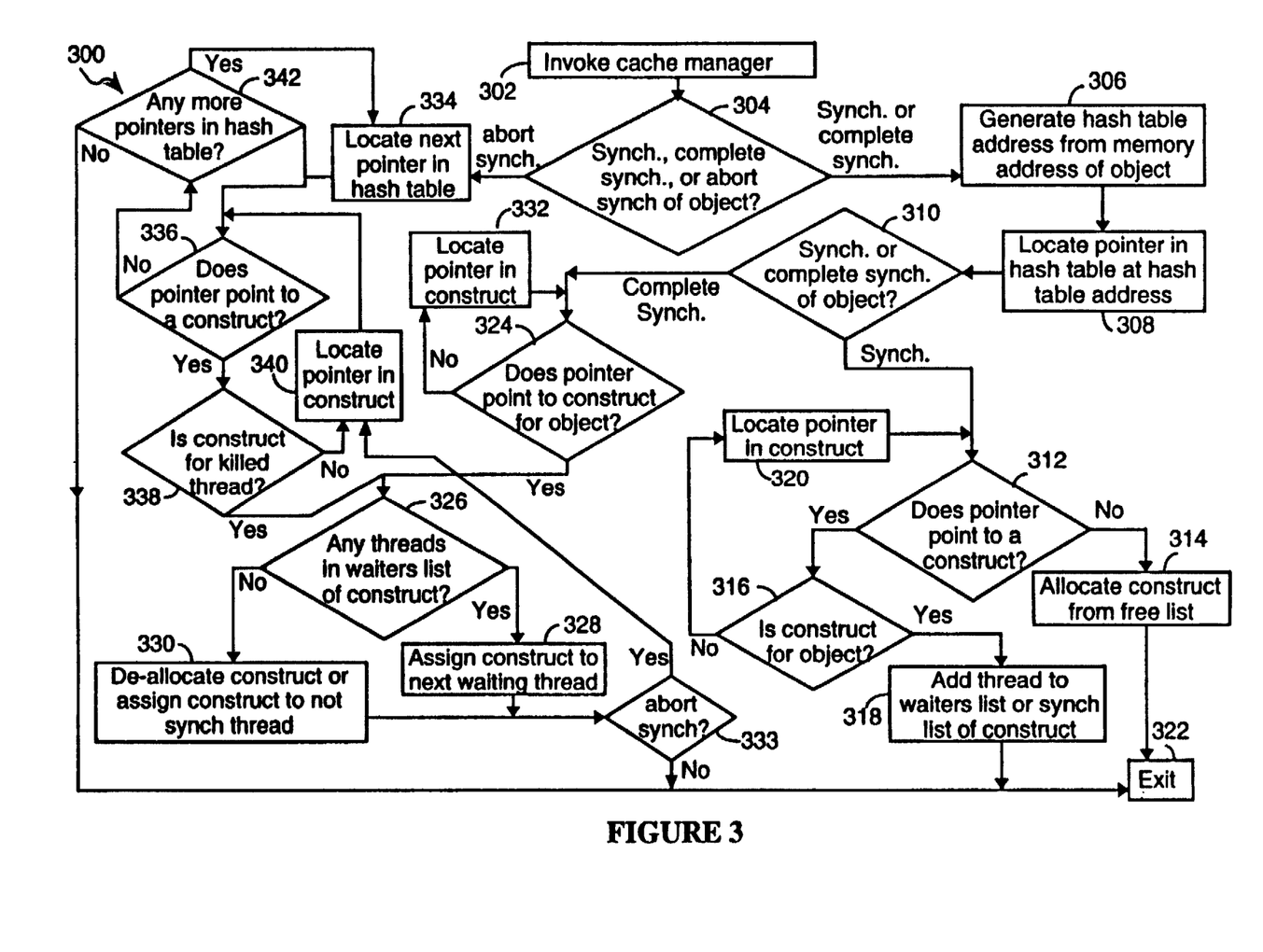
FIG. 3 is a flow chart of the method employed by the object synchronization module to synchronize an object with only one thread at a time.

In order to properly synchronize those of the objects 114 that are synchronizable, the operating system 110 includes an object synchronization module 122 that operates in accordance with the method 300 shown in FIG. 3. The object synchronization module includes a cache of object synchronization constructs 124, a cache manager 126, a hash table 128, a hash table address generator 129, a synchronization construct free list 130, a hash table size controller 131, and a cache size controller 132.

Referring to FIG. 2, the hash table 128 contains a set of pointers 205. Each pointer is at a hash table address. The hash table address generator 129 maps (or hashes) the address in the memory 108 of each of the objects 114 that is to be synchronized to a corresponding address in the hash table. This is done by computing a predetermined hash function on the memory addresses of these objects to generate the corresponding hash table addresses. In order to keep the size of the hash table in the memory small, the number of synchronization constructs 124 is less than the number of synchronizable objects. Furthermore, the memory addresses of two or more objects may be mapped by the hash table function to the same hash table address. As a result, hash table collisions may occur.

When one of the threads 116, for example thread 116-1, accesses one of the objects 114 that is synchronizable, object 114-2 in this example, the cache manager 126 is invoked by the synchronizable method 200 of the object when the thread attempts to execute that method (step 302 of FIG. 3). In invoking the cache manager, the synchronizable method instructs the cache manager that the thread attempting to execute it is seeking to synchronize the object. After determining that the thread is seeking to do this (decision step 304 of FIG. 3), the cache manager invokes the hash table address generator 129 to generate the hash table address to which the object's memory address is mapped (step 306 of FIG. 3). It does so by computing the predetermined hash function on the memory address.

The cache manager 126 then locates the pointer in the set of pointers 205 that is at the generated hash table address (step 308 of FIG. 3). Since the thread 116-1 is seeking to synchronize the object 114-2 (decision step 310 of FIG. 3), the cache manager determines if it points to any of the synchronization constructs 124 (decision step 312 of FIG. 3). If It does not, as is the case with pointer 205-2, then this means that the object is not currently synchronized with any of the threads 116 by any of the synchronization constructs. As a result, the cache manager 126 then allocates from the synchronization construct free list 130 the first synchronization construct 124-N that is contained in the free list 130 to the object and assigns it to synchronize the object with the thread (step 314 of FIG. 3).

The free list 130 is a linked list of those of the synchronization constructs 124, in this case synchronization constructs 124-N to 124-M, that are not currently allocated for synchronizing those of the objects 114 that are synchronizable. It comprises a free list header 206 and a pointer 208 in each of the un-allocated synchronization constructs. The free list header serves as a pointer to the first synchronization construct 124-N in the free list and the pointer in each synchronization construct in the free list points to the next synchronization construct in the free list, except that the pointer of the last synchronization construct 124-M in the free list does not point to any synchronization constructs.

Each of the synchronization constructs 124 includes a synchronizers (or owner) list 210 and an object identifier 212. In allocating the first synchronization construct 124-N in the free list 130 for synchronizing the object 114-2, the cache manager 126 updates the allocated synchronization construct's object identifier with the object's address to identify the object. It then assigns the allocated synchronization construct to synchronize the thread 116-1 with the object by updating the synchronization construct's synchronizer list to include the thread. The synchronizers list lists all of the threads that are currently synchronized with (or own) the object up to the predefined number of threads that may synchronize the object.

In allocating the just allocated synchronization construct 124-N, the cache manager 126 removes the synchronization construct from the free list. It does so by updating the free list header 206 so that it points to the un-allocated synchronization construct 124-N+1 that is pointed to by the pointer 208 of the just allocated synchronization construct. As a result, this un-allocated synchronization construct is now the first synchronization construct in the free list. In removing the just allocated synchronization construct from the free list, the cache manager also updates the pointer of the just allocated synchronization construct to not point to any other synchronization constructs, until a hash table collision occurs as will be discussed later. It also updates the located pointer 205-2 in the hash table 128 to point directly to the just allocated synchronization construct.

However, sometimes the located pointer, such as pointer 205-1, may already point to one of the synchronization constructs 124, in this example synchronization construct 124-1. In this case, the synchronization construct pointed to is the first synchronization construct in a linked hash table collision chain of one or more synchronization constructs, in this case hash table collision chain 125 with synchronization constructs 124-1 to 124-3, that each currently synchronize one of the objects 114 that has a memory address mapped to the hash table address of the located pointer. Moreover, the pointer 208 of each synchronization construct in the linked chain points to the next synchronization construct in the chain, except that the pointer of the last synchronization construct in the chain does not point to any synchronization construct.

The cache manager 126 then determines if the synchronization construct 124-1 is being used to synchronize the object 114-2 (decision step 316 of FIG. 3). In other words, the cache manager determines if a hash table collision has occurred with the located pointer. The cache manager determines this by comparing the memory address of the object 114-2 with the address identified by the object identifier 214 of the synchronization construct 124-1. If these addresses are the same, then this means that no hash table collision has occurred and that this synchronization construct is already synchronizing the object with one or more of the other threads 116-2 to 116-T.

For such an occurrence, each synchronization construct 124 includes a waiters list 214 which identifies those of the threads 116 that are waiting to synchronize an object that is already synchronized by the synchronization construct with the predefined number of threads that can be synchronized with the object. Thus, in the current example, the cache manager adds the thread 116-1 to the waiters list of the synchronization construct 124-1 and the thread waits to be synchronized with object 114-2 if there are already the predefined number of threads in the synchronizers list 210 (step 318 of FIG. 3). But, if there are less than this predefined number, then the thread is added to the synchronizers list (also step 318 of FIG. 3).

But, the address of the object 114-2 may not be the same as that identified by the object identifier 214 of the first synchronization construct 124-1 in the hash table collision chain 125 pointed to by the located pointer 205-1. This is the result of a hash table collision since the synchronization construct has been allocated for synchronizing another of the objects 114 that is synchronizable and has a memory address that the predetermined hash function has also mapped to the hash table address of the located pointer. When a hash collision occurs, the cache manager 126 locates the pointer 208 in the synchronization construct (step 320 of FIG. 3) and then repeats the just described process (steps 312-320 of FIG. 3) using this pointer and the pointers in succeeding synchronization constructs 124-2 and 124-3 in the chain until either the first synchronization construct 124-N in the free list 130 is allocated for synchronizing the object 114-2 (step 314 of FIG. 3) or the thread seeking to synchronize the object 114-2 is added to the waiters list 214 or synchronizers list 210 of the synchronization construct 124-1, 124-2, or 124-3 that is currently synchronizing the object 114-2 (step 318 of FIG. 3).

In repeating the process (steps 312-320 of FIG. 3) in this way, the cache manager 126 examines one by one the synchronization constructs 124-1 to 124-3 in the hash table collision chain 125 to determine if any of them is currently synchronizing the object 114-2. If the cache manager finally encounters the last synchronization construct in the chain and its pointer does not point to another synchronization construct, as might be the case with synchronization construct 124-3, then this means that the object 114-2 is not synchronized with any of the threads 116. In this case, the cache manager allocates the first synchronization construct 124-N in the free list 130 for synchronizing the object 114-2 in the same manner as that described earlier (step 314 of FIG. 3), except that the cache manager updates the pointer 208 of the last synchronization construct in the hash table collision chain to point to the just allocated synchronization construct. In this way, the linked chain is formed and maintained.

Once the first synchronization construct 124-N in the free list 130 is allocated for synchronizing the object 114-2 or the thread seeking to synchronize the object 114-2 is added to the waiters list 214 or the synchronizers list 210 of the synchronization construct 124-1, 124-2, or 124-3 that is currently synchronizing of the object 114-2, the cache manager 126 exits (step 322 of FIG. 3) until it is invoked again. This may occur when another thread is seeking to access one of the objects 114 that is synchronizable or when the object 114-2 is to be de-synchronized with the thread 116-1 because synchronization has been completed or synchronization is being aborted (or killed) because the thread has been killed.

De-Synchronization of Objects when Synchronization is Completed

When the synchronizable method 200 of one of the objects 114, such as object 114-2, is terminated, synchronization of the object with whichever of the threads 116, such as thread 116-1, is completed. When this occurs, the synchronizable method invokes the cache manager 126 (step 302 of FIG. 3) to instruct it that the thread is seeking to de-synchronize the object.

After determining this (decision step 304 of FIG. 3), the cache manager 126 invokes the hash table address generator 129 to generate the hash table address to which the memory address of the object 114-2 is mapped (step 306 of FIG. 3). It then locates the pointer, for example pointer 205-1, in the hash table 128 at the generated hash table address (step 308 of FIG. 3). This is all done in the same manner discussed earlier in the section discussing synchronization of the object.

Since the thread 116-1 is seeking to complete synchronization with the object 114-2 (decision step 310 of FIG. 3), the cache manager 126 determines if the first synchronization construct 124-1 in the hash table collision chain 125 pointed to by the located pointer 205-1 is already synchronizing the object 114-2 (decision step 324 of FIG. 3). This is done in the same manner as discussed earlier in the section discussing synchronizing the object.

If the synchronization construct 124-1 is already synchronizing the object 114-2, then the cache manager 126 determines from the waiters list 214 of the synchronization construct if any of the threads 116-2 to 116-T are waiting to synchronize the object (decision step 326 of FIG. 3). If there are any threads in the waiters list, the cache manager 126 maintains allocation of the synchronization construct with the object but assigns the synchronization construct to synchronize the object with the next thread in the waiters list 214 (step 328 of FIG. 3). It does so by removing the thread from the waiters list and updating the synchronizers list 210 of the synchronization construct to identify this thread. As a result, the thread 116-1 has been de-synchronized with the object, but the next thread in the waiters list has been synchronized with the object.

However, if there are no threads in the waiters list 214 of the synchronization construct 124-1 and there are still other threads in the synchronizers list, then the cache manager 126 maintains allocation of the synchronization construct and assigns the synchronization construct to not synchronize the thread 116-1 with the object 114-2 by simply removing the thread from the synchronizers list 210 (step 330 of FIG. 3). But, if there are no more threads in the synchronizers list, the cache manager de-allocates the synchronization construct allocated to the object 114-2 and returns it to the free list 130 (also step 330 of FIG. 3). It does so by updating the pointer of the de-allocated synchronization construct to point to the first synchronization construct 124-N in the free list 130 and updating the free list header 206 to point to the de-allocated synchronization construct. Thus, the de-allocated synchronization construct is the first synchronization construct in the free list 130. Deallocation of the synchronization construct also requires updating either the pointer 205-1 in the hash table to point to the next synchronization construct 124-2 in the hash table collision chain 125, or revision of the pointer 208 of the synchronization construct 124 in the chain just before the de-allocated synchronization construct to the next synchronization construct, if any, in the chain so as to properly update the chain.

Furthermore, the first synchronization construct 124-1 in the chain may not be synchronizing the object 114-2. In this case, the cache manager 126 locates the pointer 208 of the synchronization construct (step 332 of FIG. 3) and then repeats the just described process (steps 324-332 of FIG. 3) using this pointer and the pointers in succeeding synchronization constructs 124-2 and 124-3 in the hash table collision chain 125.

By repeating this process (steps 324-332 of FIG. 3) in this manner, the cache manager 126 examines one by one the synchronization constructs 124-1 to 124-3 in the hash table collision chain 125 to determine which of them is currently synchronizing the object 114-2. When the cache manager finally encounters the synchronization construct that is, the object is de-synchronized with the thread 116-1. As discussed above, this may occur by assigning the synchronization construct to not synchronize the object with the thread (step 330 of FIG. 3), de-allocation of the synchronization construct (also step 330 of FIG. 3), or re-allocation of the synchronization construct (step 328 of FIG. 3).

If the synchronization construct is de-allocated, and it is not the first synchronization construct in the chain, the cache manager updates the pointer of the synchronization construct in the chain that points to the de-allocated synchronization construct so that it points to the synchronization construct that is pointed to by the pointer of the de-allocated synchronization construct. But, if the de-allocated synchronization construct is the last synchronization construct in the chain, the cache manager updates the pointer of the synchronization construct in the chain whose pointer points to the de-allocated synchronization construct to not point to any of the synchronization constructs 124 so that it is now the last synchronization construct in the chain.

Then, since synchronization of the object 114-2 with the thread 116-1 was completed and not aborted (decision step 333), the cache manager 126 exits (step 322 of FIG. 3) until it is invoked again. As indicated earlier, this may occur when one of the threads 116 is seeking to invoke one of the objects 114 that is synchronizable or when one of the objects 114 is to be de-synchronized with one of threads 116 because synchronization has been completed. Or, this may occur when one of threads 116 has been killed and it was synchronized with one of the objects 114.

De-Synchronization of Objects when Thread is Killed

Synchronization of one of the objects 114, such as object 114-2, with one of the threads 116, for example thread 116-1, is to be aborted (or killed) when the thread is killed (or dies). When this occurs, the thread invokes the cache manager 126 (step 302 of FIG. 3) and instructs it that the thread has been killed and that synchronization of any object with the thread should be aborted.

After this is determined by the cache manager 126 (decision step 304 of FIG. 3), it locates the first pointer in the set of pointers 205 in the hash table 128 (step 334 of FIG. 3) and determines if it points to any of the synchronization constructs 124 (decision step 336 of FIG. 3). If it does, as in the case of pointer 205-1, then the cache manager determines if the first synchronization construct 124-1 in the chain pointed to by the pointer is synchronizing the object 114-2 that is synchronized with the killed thread 116-1 (decision step 338 of FIG. 3). It does so by determining if the synchronizer list 210 of the synchronization construct lists this thread. If it does, then the cache manager determines if there are any threads waiting to synchronize the object (decision step 326 of FIG. 3) and assigns the synchronization construct to not synchronize the thread with the object (step 330 of FIG. 3), or de-allocates the synchronization construct (also step 330 of FIG. 3), or re-allocates the synchronization construct (step 328 of FIG. 3) in the manner described earlier.

However, the cache manager 126 may determine that the synchronization construct 124-1 is not synchronizing the object 114-2 that is synchronized with the killed thread 116-1. When this occurs, the cache manager locates the pointer in the synchronization construct (step 340 of FIG. 3) and repeats the just described process (steps 336 to 340 and 326 to 330) using this pointer and the pointers of the succeeding synchronization constructs 124-2 and 124-3 in the hash table collision chain 125 until the synchronization construct that synchronizes the killed thread with the object has been assigned to no longer synchronize the killed thread with the object (step 330 of FIG. 3), is de-allocated (also step 330 of FIG. 3), re-allocated (step 328 of FIG. 3), or the last synchronization construct 124-3 in the chain is encountered and does not point to any other synchronization constructs 124 (decision step 336 of FIG. 3). If the latter is the case, then the entire process (steps 334 to 340 and 326 to 330) is repeated for the next pointer, for example pointer 205-2, in the hash table 128 until there are no more pointers in the hash table (decision step 342 of FIG. 3).

However, once synchronization of the object 114-2 with the thread 116-1 that was killed has been aborted (decision step 333 of FIG. 3), the cache manager 126 continues to look for other synchronization constructs that are synchronized with the thread that was killed to abort synchronization of that thread with any other objects that it is synchronized with. This is done by repeating the earlier described process (steps 334-342, 326-330, and 333 of FIG. 3 by starting at step 340 of FIG. 3) until there are no more pointers in the hash table (decision step 342).

After aborting synchronization of all of the objects (including the object 114-2) that were synchronized with the killed thread 116-1, the cache manager 126 exits (step 322 of FIG. 3) until it is invoked again. Once again, this may occur when one of the threads 116 is seeking to invoke one of the objects 114 that is synchronizable or when one of the objects 114 is to be de-synchronized with one of threads 116 because synchronization has been completed or the thread is being killed.

Changing Size of Hash Table and Cache of Synchronization Constructs

The hash table size controller 132 may adaptively adjust the size of the hash table 128 and the cache size controller 131 may adaptively adjust the number of synchronization constructs 124 depending on various factors. In this way, memory space in the memory 108 may be conserved for other uses, the execution speed of the threads 116 may be increased, and the speed with which synchronization constructs are allocated and de-allocated may be increased.

For example, when there are less than a predefined threshold number of the synchronization constructs 124-N to 124-M in the free list 130, the cache size controller 131 may add one or more synchronization constructs to the free list to increase the size of the cache of synchronization constructs 124 if there is appropriate space in the memory 108. This is done by updating the pointer of the last of the added synchronization constructs to point to the synchronization construct pointed to by the free list header 206, except that if the free list header does not point to any synchronization constructs (i.e., the threshold number=1), then the pointer of the last of the added synchronization constructs is updated to point to no other synchronization constructs so that it is the last synchronization construct in the free list. Moreover, the cache size controller 131 then updates the free list header to point to the first of the added synchronization constructs and the pointer of each added synchronization construct to point to the next added synchronization construct, except that the pointer of the last synchronization construct is updated in the manner just described. As a result, the speed of execution of the threads 116 is increased because a thread seeking to synchronize one of the objects 114 will not have to wait for one of the synchronization constructs to be de-allocated and added to the free list.

Similarly, to conserve memory space for other uses, the number of the synchronization constructs 124-N to 124-M in the free list 130 may be decreased when the free list has more than another predefined threshold number of synchronization constructs in it. This is done by updating the free list header to point to the synchronization construct in the free list that is to be the new first synchronization construct in the free list so that the synchronization constructs that came before it in the free list are removed from the free list. Thus, the space occupied in the memory 108 by the removed synchronization constructs may now be used for other purposes.

In addition, the number of hash table addresses in the hash table 128 may be increased or decreased by the hash table size controller 132. This is done to increase the size of the hash table 128 when the average number of synchronization constructs in all of the hash table collision chains 125 exceeds a first predefined threshold number. Similarly, this is done to decrease the size of the hash table when the average number of synchronization constructs in all of the hash table collision chains 125 is less than a second predefined threshold number.

The hash table size controller 132 does this by assigning to the hash table address generator 129 a predefined re-hash function for re-mapping (or re-hashing) the memory addresses of those of the objects 114 already synchronized by one of the synchronization constructs 124 to a corresponding hash table address. To do so, it locates one by one each of these synchronization constructs by using the pointers 205 in the current hash table and the pointers 208 of synchronization constructs in hash table collision chains pointed to by the pointers in the current hash table. After each synchronization construct is located, the cache manager 126 then invokes the hash table address generator 129 to compute the re-hash function on the memory address of the object identified by the located synchronization construct's object identifier. The pointer at the resulting hash table address of the re-hash table is then updated with a pointer to the located synchronization construct if the pointer at that re-hash table address does not point to any synchronization constructs (i.e., no hash table collision has occurred). But, if the pointer at the re-hash table address does point to the first synchronization construct in a re-hash table collision chain (i.e., a hash table collision has occurred), then the cache manager updates the last synchronization construct in the re-hash table collision chain to point to the located synchronization construct. In either case, the pointer of the located synchronization construct is updated to point to no other synchronization constructs.

By increasing the size of the hash table 128 by using a re-hash function that increases the number of hash table addresses, the speed at which the synchronization constructs 124 can be allocated, re-allocated, and de-allocated is increased because there are fewer hash table collision chains to sort through. Moreover, by decreasing the size of the hash table using a re-hash function that decreases the number of hash table addresses, the space formerly occupied by the pointers at the hash table addresses removed in the re-hashing process can be used for other purposes.

Additional Features and Alternative Embodiments

In the preferred embodiments access to the cache manager 126 itself is managed by a dedicated synchronization construct. In this way, only one thread of execution can access the cache manager at a time, and all subsequent synchronization construct manager requests are put on a waiting thread list until the first thread completes its use of the cache manager.

Furthermore, the invention has been described as utilizing synchronization constructs 124 for synchronizing objects 114 with threads 116. These synchronization constructs may be well known synchronization constructs such as mutexes, monitors, and semiphores.

In the case where the synchronization constructs 124 are mutexes, the mutexes may simply operate in the way described earlier without any additional synchronization features. Moreover, the predefined number of threads 116 that can be synchronized with one of the objects 114 at a time may be one. Therefore, a mutex is locked when it is allocated and has its synchronizers list 210 (or synchronizer identifier in the case where only one thread can be synchronized with an object) updated to identify the thread that is synchronized with an object and unlocked when it is de-allocated.

However, when the synchronization constructs 124 are monitors that monitor synchronization of the objects 114, they may additionally include a suspenders list. The suspenders list of a monitor contains those of the threads 116 that have suspended their synchronization with the object that has its synchronization monitored by the monitor. A thread is added to the suspenders list when the data required by a synchronized method of the object has not yet become available. This is done with a condition variable in the synchronized method that notifies the cache manager 126 to add the thread to the suspenders list when the data is not available. When the data does become available, the method that makes the data available notifies the cache manager that the data is available and the cache manager removes the thread from the suspenders list and synchronization of the thread with the object resumes.

In the case where the synchronization constructs 124 are semiphores, the predefined number of threads 116 that may be synchronized with one of the objects 114 at one time may be N. As a result, up to N threads may be listed in the synchronizers list 210 at one time while waiting threads are listed in the free list 130.

Furthermore, the invention has also been described as embodying synchronization constructs that include pointers that can be used to provide a free list of synchronization constructs that are not allocated and that can be also used to simultaneously provide chains of allocated synchronization constructs of synchronizable objects that have memory addresses mapped to the same hash table addresses. However, those skilled in the art will recognize that other schemes may be used to provide a free list of un-allocated synchronization constructs and to track hash table collisions caused by synchronization constructed objects that have memory addresses mapped to the same hash table address.

While the present invention has been described with reference to a few specific embodiments, the description is illustrative of the invention and is not to be construed as limiting the invention. Furthermore, various other modifications may occur to those skilled in the art without departing from the true spirit and scope of the invention as defined by the appended claims.

What is claimed is:

1. In a computer system that includes a plurality of threads and a set of objects that each can only be synchronized with a predefined number of said threads at a time, an object synchronization module comprising:
   a cache of synchronization constructs, the number of the synchronization constructs being less than the number of the objects;
   a free list of each of said synchronization constructs that are not currently allocated; and
   a cache manager that allocates respective ones of the synchronization constructs from said free list to respective ones of the objects when at least one of said threads requests synchronization with said respective objects, and that deallocates each respective one of said synchronization constructs from a corresponding one of said objects and returns said deallocated synchronization construct to said free list of synchronization constructs when none of said threads are waiting to be synchronized with said corresponding object and none of said threads is currently synchronized with said respective object.

2. The object synchronization module of claim 1, wherein said cache manager maintains allocation of each said respective synchronization construct to a corresponding respective object so long as there is at least one thread that is waiting to be synchronized with said respective object and so long as there is one thread that is currently synchronized with said respective object.

3. In a computer system that includes a plurality of threads and a set of objects that each can only be synchronized with a predefined number of said threads at a time, an object synchronization module comprising:
   a cache of synchronization constructs, the number of the synchronization constructs being less than the number of the objects;
   a free list of each of said synchronization constructs that are not currently allocated; and
   a cache manager that allocates respective ones of the synchronization constructs from said free list to respective ones of the objects when at least one of said threads requests synchronization with said respective objects, and that deallocates each respective one of said synchronization constructs from a corresponding one of said objects and returns said deallocated synchronization construct to said free list of synchronization constructs when none of said threads are waiting to be synchronized with said corresponding object and none of said threads is currently synchronized with said respective object;

wherein:

each of said synchronization constructs includes (A) an object identifier, (B) a synchronizers list, and (C) a waiters list;

said cache manager, for each respective thread of the threads that seeks synchronization with a respective one of the objects, allocates a respective synchronization construct in the free list for synchronizing the respective thread with the respective object when none of the synchronization constructs is currently allocated for synchronizing the respective object with any of the threads, the cache manager allocating the respective synchronization construct by (A) updating the respective synchronization construct's object identifier to identify the respective object as being synchronized by said respective one of said synchronization constructs, (B) updating the respective synchronization construct's synchronizers list to include the respective thread so as to indicate that the respective thread is synchronized with the respective object, and (C) removing the respective synchronization construct from the free list;

the cache manager adding the respective thread to the waiters list of a particular one of the synchronization constructs so that the respective thread must wait to be synchronized with the respective object when the particular synchronization construct is currently allocated for synchronizing the respective object with a particular thread of the threads;

the cache manager, for each specific one of the threads that seeks de-synchronization with a specific one of the objects when a specific one of the synchronization constructs is currently allocated for synchronizing the specific thread with the specific object, re-allocating the specific synchronization construct for synchronizing a waiting one of the threads with the specific object when the specific synchronization construct's waiters list contains the waiting thread, the cache manager re-allocating the specific synchronization construct by (A) updating the specific synchronization construct's synchronizer identifier to identify the waiting thread, and (B) removing the waiting thread from the specific synchronization construct's waiters list;

the cache manager deallocating the specific synchronization construct when the specific synchronization construct's waiters list does not contain any waiting threads of the threads, the cache manager deallocating the specific synchronization construct by adding the specific synchronization construct to the free list.

4. The object synchronization module of claim 3 wherein:

each of the objects is stored in a memory and has a corresponding memory address;

the object synchronization module further comprises:

a hash table that is assigned a set of current hash table addresses according to a current hash function that maps the memory addresses of the objects to the current hash table addresses, the hash table containing a pointer located at each particular hash table address of the current hash table addresses that, when one or more of the synchronization constructs have been allocated for synchronizing a corresponding one or more of the objects whose memory addresses are mapped to the particular hash table address, points to a corresponding linked chain of the one or more of the synchronization constructs, and otherwise points to none of the synchronization constructs;

a hash table address generator that maps the memory address of a respective object into one of said current hash table addresses;

the cache manager allocating the respective synchronization construct from the free list further by (A) when the pointer located at the generated respective hash table address does not point to any of the synchronization constructs, indicating that the respective object is not currently synchronized with any of the threads, beginning a corresponding new linked chain of synchronization constructs that includes the respective synchronization construct and updating the pointer at the generated respective hash table address to point to the corresponding new linked chain, and (B) when the pointer located at the generated respective hash table address points to a corresponding respective linked chain of synchronization constructs and none of the one or more synchronization constructs in the corresponding respective linked chain are currently allocated to the respective object, adding the respective synchronization construct to the corresponding respective linked chain;

the cache manager adding the respective thread to the particular synchronization construct's waiters list when the pointer at the generated respective hash table address points to a corresponding particular linked chain of the linked chains that includes the particular synchronization construct.

5. The object synchronization module of claim 4, wherein the cache manager, when the specific thread seeks de-synchronization of the specific object upon the specific thread being killed, updates the corresponding specific synchronization construct, including inspecting the pointers at the current hash table addresses to locate a linked chain of synchronization constructs that includes the specific synchronization construct.

6. The object synchronization module of claim 4, wherein:

the hash table, the threads, the synchronization constructs, and the hash table address generator are also stored in the memory;

the object synchronization module further comprises:

a hash table size controller stored in said memory that re-hashes said hash table to (A) increase said size of said hash table in said memory when an average length of said linked chains exceeds a first threshold, and (B) decrease said size of said hash table in said memory when the average length of said linked chains is less than a second threshold number.

7. In a computer system that includes a plurality of threads and a set of objects that each can only be synchronized with a predefined number of said threads at a time, an object synchronization module comprising:

a cache of synchronization constructs, the number of the synchronization constructs being less than the number of the objects;

a free list of each of said synchronization constructs that are not currently allocated; and a cache manager that allocates respective ones of the synchronization constructs from said free list to respective ones of the objects when at least one of said threads requests synchronization with said respective objects, and that deallocates each respective one of said synchronization constructs from a corresponding one of said objects and returns said deallocated synchronization construct to said free list of synchronization constructs when none of said threads are waiting to be synchronized with said corresponding object and none of said threads is currently synchronized with said respective object;

wherein:

the objects, the threads, and the synchronization constructs are stored in a memory;

the object synchronization module further comprises a synchronization construct cache size controller stored in the memory that (A) when the free list includes more than a first threshold number of the synchronization constructs, removes synchronization constructs from the free list so that the removed synchronization constructs are no longer in the memory and not allocatable by the cache manager, and (B) when the free list includes less than a second threshold number of the synchronization constructs, creates synchronization constructs in the memory that are added to the free list and are allocatable by the cache manager.

8. In a computer system that includes a plurality of threads and a set of objects that each can only be synchronized with one of the threads at a time, a method of synchronizing one of the objects with one of the threads at a time, the method comprising the steps of:

providing a cache of synchronization constructs, the number of the synchronization constructs being less than the number of the objects;

providing a free list of each of the synchronization constructs that is not currently allocated;

allocating respective ones of the synchronization constructs from said free list to respective ones of the objects when at least one of said threads requests synchronization with said respective objects; and deallocating each respective one of said synchronization constructs from a corresponding one of said objects and returning said deallocated synchronization construct to said free list of synchronization constructs when none of said threads are waiting to be synchronized with said corresponding object and none of said threads is currently synchronized with said respective object.

9. The method of claim 8, including maintaining allocation of each said respective synchronization construct to a corresponding respective object so long as there is at least one thread that is waiting to be synchronized with said respective object and so long as there is one thread that is currently synchronized with said respective object.

10. In a computer system that includes a plurality of threads and a set of objects that each can only be synchronized with one of the threads at a time, a method of synchronizing one of the objects with one of the threads at a time, the method comprising the steps of:

providing a cache of synchronization constructs, the number of the synchronization constructs being less than the number of the objects;

providing a free list of each of the synchronization constructs that is not currently allocated;

allocating respective ones of the synchronization constructs from said free list to respective ones of the objects when at least one of said threads requests synchronization with said respective objects; and deallocating each respective one of said synchronization constructs from a corresponding one of said objects and returning said deallocated synchronization construct to said free list of synchronization constructs when none of said threads are waiting to be synchronized with said corresponding object and none of said threads is currently synchronized with said respective object;

each of the synchronization constructs including (A) an object identifier, (B) a synchronizer identifier, and (C) a waiters list;

the method including:

for each respective thread of the threads that seeks synchronization with a respective object of the objects, allocating a respective synchronization construct in the free list for synchronizing the respective thread with the respective object when none of the synchronization constructs is currently allocated for synchronizing the respective object with any of the threads, the allocating step including (A) updating the respective synchronization construct's object identifier to identify the respective object as being synchronized by the respective synchronization construct, (B) updating the respective synchronization construct's synchronizer identifier to identify the respective thread as being synchronized with the respective object, and (C) removing the respective synchronization construct from the free list;

adding the respective thread to the waiters list of a particular synchronization construct of the synchronization constructs so that the respective thread must wait to synchronize the respective object when the particular synchronization construct is currently allocated for synchronizing the respective object with a particular thread of the threads;

for each specific thread of the threads that seeks de-synchronization with a specific object of the objects when a specific synchronization construct of the synchronization constructs is currently allocated for synchronizing the specific thread with the specific object, re-allocating the specific synchronization construct for synchronizing a waiting thread of the threads with the specific object when the specific synchronization construct's waiters list contains the waiting thread, the re-allocating step including (A) updating the specific synchronization construct's synchronizer identifier to identify the waiting thread, and (B) removing the waiting thread from the specific synchronization construct's waiters list; and de-allocating the specific synchronization construct when the specific synchronization construct's waiters list does not contain any waiting threads of the threads, the de-allocating step including adding the specific synchronization construct to the free list.

11. The method of claim 10, wherein:

each of the objects is stored in a memory and has a corresponding memory address;

the method further comprises the steps of:

providing a hash table that is assigned a set of current hash table addresses according to a current hash function that maps the memory addresses of the objects to the current hash table addresses, the hash table containing a pointer located at each particular hash table address of the current hash table addresses that points to (A) when one or more of the synchronization constructs have been allocated for synchronizing corresponding one or more of the objects whose memory addresses are mapped to the particular hash table address, a corresponding linked chain of the one or more of the synchronization constructs, and (B) when none of the synchronization constructs have been allocated for synchronizing any of the objects whose memory addresses are mapped to the particular hash table address, none of the linked chains;

generating a respective hash table address of the current hash table addresses that is mapped to the memory address of the respective object according to the current hash function when the respective thread seeks synchronization of the respective object, generating a specific hash table address of the current hash table addresses that is mapped to the memory address of the specific object according to the current hash function when the specific thread seeks de-synchronization of the specific object upon completion of synchronization with the specific object;

the allocating step further including (A) when the pointer located at the generated respective hash table address does not point to any of the linked chains so that the respective object is not currently synchronized with any thread of the threads, beginning a corresponding new linked chain of the linked chains that includes the respective synchronization construct and updating the pointer at the generated respective hash table address to point to the corresponding new linked chain, and (B) when the pointer located at the generated respective hash table address points to a corresponding respective linked chain of the linked chains and none of the one or more synchronization constructs in the corresponding respective linked chain are currently synchronized with any of the threads, adding the respective synchronization construct to the corresponding respective linked chain, the adding to the waiters list step further occurring when the pointer at the generated respective hash table address points to a corresponding particular linked chain of the linked chains that includes the particular synchronization construct;

the re-allocating and de-allocating steps each further occurring when the pointer at the generated specific hash table address points to a corresponding specific linked chain of the linked chains that includes the specific synchronization construct.

12. The method of claim 11 wherein, when the specific thread seeks de-synchronization of the specific object upon the specific thread being killed, the de-allocating and re-allocating steps each further including using one by one the pointers at the current hash table addresses to locate a linked chain of the linked chains that includes the specific synchronization construct.

13. The method of claim 11 wherein:

the hash table, the threads, the synchronization constructs, and the hash table address generator are also stored in the memory;

the method further comprises the steps of:

re-hashing the hash table to (A) increase the size of the hash table in the memory when an average length of the linked chains exceeds a first threshold, and (B) decrease the size of the hash table in the memory when the average length of said linked chains is less than a second threshold.

14. In a computer system that includes a plurality of threads and a set of objects that each can only be synchronized with one of the threads at a time, a method of synchronizing one of the objects with one of the threads at a time, the method comprising the steps of:

providing a cache of synchronization constructs, the number of the synchronization constructs being less than the number of the objects;

providing a free list of each of the synchronization constructs that is not currently allocated;

allocating respective ones of the synchronization constructs from said free list to respective ones of the objects when at least one of said threads requests synchronization with said respective objects; and deallocating each respective one of said synchronization constructs from a corresponding one of said objects and returning said deallocated synchronization construct to said free list of synchronization constructs when none of said threads are waiting to be synchronized with said corresponding object and none of said threads is currently synchronized with said respective object;

wherein:

the objects, the threads, and the synchronization constructs are stored in a memory;

the method further comprises the steps of:

when the free list includes more than a first threshold number of the synchronization constructs, removing synchronization constructs from the free list so that the removed synchronization constructs are no longer in the memory and not allocatable by the cache manager;

when the free list includes less than a second threshold number of the synchronization constructs, creating synchronization constructs in the memory that are added to the free list and are allocatable by the cache manager.

15. A computer program product for use in conjunction with a computer system that includes a plurality of threads and a set of objects that each can only be synchronized with one of the threads at a time, the computer program product comprising a computer readable storage medium and a computer program mechanism embedded therein, the computer program mechanism comprising:

executable instructions for establishing a cache of synchronization constructs, the number of the synchronization constructs being less than the number of the objects;

executable instructions for establishing a free list of each of the synchronization constructs that is not currently allocated; and a cache manager that allocates respective ones of the synchronization constructs from said free list to respective ones of the objects when at least one of said threads requests synchronization with said respective objects, and that deallocates each respective one of said synchronization constructs from a corresponding one of said objects and returns said deallocated synchronization construct to said free list of synchronization constructs when none of said threads are waiting to be synchronized with said corresponding object and none of said threads is currently synchronized with said respective object.

16. The computer program product of claim 15, wherein said cache manager maintains allocation of each said respective synchronization construct to a corresponding respective object so long as there is at least one thread that is waiting to be synchronized with said respective object and so long as there is one thread that is currently synchronized with said respective object.

17. A computer program product for use in conjunction with a computer system that includes a plurality of threads and a set of objects that each can only be synchronized with one of the threads at a time, the computer program product comprising a computer readable storage medium and a computer program mechanism embedded therein, the computer program mechanism comprising:

executable instructions for establishing a cache of synchronization constructs, the number of the synchronization constructs being less than the number of the objects;

executable instructions for establishing a free list of each of the synchronization constructs that is not currently allocated; and a cache manager that allocates respective ones of the synchronization constructs from said free list to respective ones of the objects when at least one of said threads requests synchronization with said respective objects, and that deallocates each respective one of said synchronization constructs from a corresponding one of said objects and returns said deallocated synchronization construct to said free list of synchronization constructs when none of said threads are waiting to be synchronized with said corresponding object and none of said threads is currently synchronized with said respective object;

wherein:

each of the synchronization constructs including (A) an object identifier, (B) a synchronizer identifier, and (C) a waiters list;

said cache manager, for each respective thread of the threads that seeks synchronization with a respective one of the objects, allocates a respective synchronization construct in the free list for synchronizing the respective thread with the respective object when none of the synchronization constructs is currently allocated for synchronizing the respective object with any of the threads, the cache manager allocating the respective synchronization construct by (A) updating the respective synchronization construct's object identifier to identify the respective object as being synchronized by the respective synchronization construct, (B) updating the respective synchronization construct's synchronizer identifier to identify the respective thread as being synchronized with the respective object, and (C) removing the respective synchronization construct from the free list;

the cache manager adding the respective thread to the waiters list of a particular one of the synchronization constructs so that the respective thread must wait to be synchronized with the respective object when the particular synchronization construct is currently allocated for synchronizing the respective object with a particular thread of the threads;

the cache manager, for each specific one of the threads that seeks de-synchronization with a specific one of the objects when a specific one of the synchronization constructs is currently allocated for synchronizing the specific thread with the specific object, re-allocating the specific synchronization construct for synchronizing a waiting one of the threads with the specific object when the specific synchronization construct's waiters list contains the waiting thread, the cache manager re-allocating the specific synchronization construct by (A) updating the specific synchronization construct's synchronizer identifier to identify the waiting thread, and (B) removing the waiting thread from the specific synchronization construct's waiters list;

the cache manager de-allocating the specific synchronization construct when the specific synchronization construct's waiters list does not contain any waiting threads of the threads, the cache manager de-allocating the specific synchronization construct by adding the specific synchronization construct to the free list.

18. The computer program product of claim 17 wherein:

each of the objects is stored in said memory and has a corresponding memory address;

the object synchronization module further comprises:

a hash table that is assigned a set of current hash table addresses according to a current hash function that maps the memory addresses of the objects to the current hash table addresses, the hash table containing a pointer located at each particular hash table address of the current hash table addresses that, when one or more of the synchronization constructs have been allocated for synchronizing a corresponding one or more of the objects whose memory addresses are mapped to the particular hash table address, points to a corresponding linked chain of the one or more of the synchronization constructs, and otherwise points to none of the synchronization constructs;

a hash table address generator that maps the memory address of a respective object into a one of said current hash table addresses;

the cache manager allocating the respective synchronization construct from the free list further by (A) when the pointer located at the generated respective hash table address does not point to any of the synchronization constructs, indicating that the respective object is not currently synchronized with any of the thread, beginning a corresponding new linked chain of synchronization constructs that includes the respective synchronization construct and updating the pointer at the generated respective hash table address to point to the corresponding new linked chain, and (B) when the pointer located at the generated respective hash table address points to a corresponding respective linked chain of synchronization constructs and none of the one or more synchronization constructs in the corresponding respective linked chain are currently allocated to the respective object, adding the respective synchronization construct to the corresponding respective linked chain;

the cache manager adding the respective thread to the particular synchronization construct's waiters list when the pointer at the generated respective hash table address points to a corresponding particular linked chain of the linked chains that includes the particular synchronization construct.

19. The computer program product of claim 18, wherein the cache manager, when the specific thread seeks de-synchronization of the specific object upon the specific thread being killed, updates the corresponding specific synchronization construct, including inspecting the pointers at the current hash table addresses to locate a linked chain of synchronization constructs that includes the specific synchronization construct.

20. The computer program product of claim 18, wherein:

the hash table, the threads, the synchronization constructs, and the hash table address generator are also stored in the memory;

the object synchronization module further comprises:
  a hash table size controller stored in said memory that re-hashes said hash table to (A) increase said size of said hash table in said memory when an average length of said linked chains exceeds a first threshold, and (B) decrease said size of said hash table in said memory when the average length of said linked chains is less than a second threshold.

21. A computer program product for use in conjunction with a computer system that includes a plurality of threads and a set of objects that each can only be synchronized with one of the threads at a time, the computer program product comprising a computer readable storage medium and a computer program mechanism embedded therein, the computer program mechanism comprising:
  executable instructions for establishing a cache of synchronization constructs, the number of the synchronization constructs being less than the number of the objects;
  executable instructions for establishing a free list of each of the synchronization constructs that is not currently allocated; and
  a cache manager that allocates respective ones of the synchronization constructs from said free list to respective ones of the objects when at least one of said threads requests synchronization with said respective objects, and that deallocates each respective one of said synchronization constructs from a corresponding one of said objects and returns said deallocated synchronization construct to said free list of synchronization constructs when none of said threads are waiting to be synchronized with said corresponding object and none of said threads is currently synchronized with said respective object;
wherein:
  the objects, the threads, and the synchronization constructs are stored in a memory;
  the object synchronization module further comprises a synchronization construct cache size controller stored in the memory that (A) when the free list includes more than a first threshold number of the synchronization constructs, removes synchronization constructs from the free list so that the removed synchronization constructs are no longer in the memory and not allocatable by the cache manager, and (B) when the free list includes less than a second threshold number of the synchronization constructs, creates synchronization constructs in the memory that are added to the free list and are allocatable by the cache manager.

22. In a computer system that includes a plurality of threads and a set of objects that each can be synchronized only with a predefined number of said threads at a time, an object synchronization module comprising:
  a cache of synchronization constructs, the number of the synchronization constructs being less than the number of the objects;
  a free list of each of said synchronization constructs that are not currently allocated; and
  a cache manager that (A) removes a respective one of said synchronization constructs from said free list, allocates said respective one of said synchronization constructs to a respective one of said objects, and assigns said respective one of said synchronization constructs to synchronize a respective one of said threads with said respective one of said objects when said respective one of said threads requests synchronization with said respective one of said objects and no others of said synchronization constructs are allocated to said respective one of said objects, and (B) de-allocates said respective one of said synchronization constructs from said respective one of said objects and returns said respective one of said synchronization constructs to said free list when said respective one of said threads requests de-synchronization with said respective one of said objects, said respective one of said synchronization constructs has not been assigned to synchronize any others of said threads with said respective one of said objects, and no others of said threads are waiting to synchronize said respective one of said objects.

23. In a computer system that includes a plurality of threads and a set of objects that each can be synchronized only with a predefined number of said threads at a time, an object synchronization module comprising:
  a cache of synchronization constructs, the number of the synchronization constructs being less than the number of the objects;
  a free list of each of said synchronization constructs that are not currently allocated; and
  a cache manager that (A) removes a respective one of said synchronization constructs from said free list, allocates said respective one of said synchronization constructs to a respective one of said objects, and assigns said respective one of said synchronization constructs to synchronize a respective one of said threads with said respective one of said objects when said respective one of said threads requests synchronization with said respective one of said objects and no others of said synchronization constructs are allocated to said respective one of said objects, and (B) de-allocates said respective one of said synchronization constructs from said respective one of said objects and returns said respective one of said synchronization constructs to said free list when said respective one of said threads requests de-synchronization with said respective one of said objects, said respective one of said synchronization constructs has not been assigned to synchronize any others of said threads with said respective one of said objects, and no others of said threads are waiting to synchronize said respective one of said objects;
wherein said cache manager maintains allocation of said respective one of said synchronization constructs to said respective one of said objects and assigns said respective one of said synchronization constructs to synchronize a waiting one of said threads with said respective one of said objects but no longer synchronize said respective one of said threads with said respective one of said objects when said respective one of said threads seeks de-synchronization with said respective one of said objects, said respective one of said synchronization constructs has been assigned to synchronize said predefined number of said threads including said respective one of said threads with said respective one of said objects, and said waiting one of said threads is waiting to synchronize said respective one of said objects.

24. The object synchronization module of claim 23, wherein said cache manager maintains allocation of said respective one of said synchronization constructs to said respective one of said objects and assigns said respective one of said synchronization constructs to no longer synchronize said respective one of said threads with said respective one of said objects when said respective one of said threads requests de-synchronization with said respective one of said objects, when said respective one of said synchronization constructs has been assigned to synchronize said respective one of said threads and at least one other of said threads with said respective one of said objects, and when no others of said threads are waiting to synchronize said respective one of said objects.

25. The object synchronization module of claim 24, wherein said cache manager makes said respective one of said threads wait to synchronize said respective one of said objects when said respective one of said threads requests synchronization with said respective one of said objects, when said respective one of said synchronization constructs has been allocated to said respective one of said objects, and when said respective one of said synchronization constructs has been assigned to synchronize said predefined number of said threads with said respective one of said objects.

26. The object synchronization module of claim 25, wherein said cache manager maintains allocation of said respective one of said synchronization constructs and assigns said respective one of said synchronization constructs to synchronize said respective one of said objects when said respective one of said threads requests synchronization with said respective one of said objects, said respective one of said synchronization constructs has been allocated to said respective one of said objects, and said respective one of said synchronization constructs has been assigned to synchronize less than said predefined number of said threads with said respective one of said objects.

27. The object synchronization module of claim 26, wherein:

each of said monitors includes (A) an object identifier, (B) a synchronizers list, and (C) a waiters list;

said cache manager allocates said respective one of said synchronization constructs to said respective one of said objects by updating the respective one of said synchronization constructs' object identifier to identify said respective one of said objects;

said cache manager assigns said respective one of said synchronization constructs to synchronize said respective one of said threads with said respective one of said objects by updating said respective one of said synchronization constructs' synchronizers list to include said respective one of said threads;

said cache manager making said respective one of said threads wait to synchronize said respective one of said objects by adding said respective one of said threads to said respective one of said synchronization constructs' waiters list;

said cache manager assigning said respective one of said synchronization constructs to synchronize said waiting one of said threads by adding said waiting one of said threads to said respective one of said synchronization constructs' synchronizers list;

said cache manager assigning said respective one of said synchronization constructs to no longer synchronize said respective one of said threads by removing said respective one of said threads from said respective one of said synchronization constructs' synchronizers list.

28. In a computer system that includes a plurality of threads and a set of objects that each can be synchronized only with a predefined number of said threads at a time, an object synchronization module comprising:

a cache of synchronization constructs, the number of the synchronization constructs being less than the number of the objects;

a free list of each of said synchronization constructs that are not currently allocated; and a cache manager that (A) removes a respective one of said synchronization constructs from said free list, allocates said respective one of said synchronization constructs to a respective one of said objects, and assigns said respective one of said synchronization constructs to synchronize a respective one of said threads with said respective one of said objects when said respective one of said threads requests synchronization with said respective one of said objects and no others of said synchronization constructs are allocated to said respective one of said objects, and (B) de-allocates said respective one of said synchronization constructs from said respective one of said objects and returns said respective one of said synchronization constructs to said free list when said respective one of said threads requests de-synchronization with said respective one of said objects, said respective one of said synchronization constructs has not been assigned to synchronize any others of said threads with said respective one of said objects and no others of said threads are waiting to synchronize said respective one of said objects;

wherein:

each of said objects is stored in memory and has a corresponding memory address;

said object synchronization module further comprises:

a hash table that is assigned a set of current hash table addresses, said memory addresses of said objects being mapped to said current hash table addresses according to a current hash function, said hash table containing a pointer located at each particular hash table address of said current hash table addresses that, when one or more of said synchronization constructs have been allocated for synchronizing a corresponding one or more of said objects whose memory addresses are mapped to said particular hash table address, points to a corresponding linked chain of said one or more of said synchronization constructs, and otherwise points to none of said synchronization constructs;

a hash table address mapper that, when said respective one of said threads requests synchronization with said respective one of said objects, maps said memory address of said respective one of said objects into one of said current hash table addresses according to said current hash function;

said cache manager allocating said respective one of said synchronization constructs further by (A) when said pointer located at said generated respective hash table address does not point to any of said synchronization constructs so as to indicate that said respective object is not currently synchronized with any of said thread, beginning a new linked chain of synchronization constructs that includes said respective one of said synchronization constructs and updating said pointer at said generated respective hash table address to point to said corresponding new linked chain, and (B) when said pointer located at said generated respective hash table address points to a corresponding respective linked chain of synchronization constructs and none of said one or more synchronization constructs in said corresponding respective linked chain are currently allocated to said respective object, adding said respective one of said synchronization constructs to said corresponding respective linked chain;

said cache manager adding said respective one of said threads to said respective one of said synchronization constructs' waiters list when said pointer at said generated respective hash table address points to a corresponding linked chain of said linked chains that includes said respective one of said synchronization constructs.

29. The object synchronization module of claim 28, wherein said cache manager, when said respective one of said threads seeks de-synchronization of said respective one of said objects upon said respective one of said threads being killed, updates said respective one of said synchronization constructs, including inspecting said pointers at said current hash table addresses to locate a linked chain of synchronization constructs that includes said respective one of said synchronization constructs.

30. The object synchronization module of claim 29, wherein:
said hash table, said threads, said synchronization constructs, and said hash table address generator are also stored in memory;
said object synchronization module further comprises:
a hash table size controller stored in said memory that re-hashes said hash table to (A) increase said size of said hash table in said memory when an average length of said linked chains exceeds a first threshold, and (B) decrease said size of said hash table in said memory when the average length of said linked chains is less than a second threshold.

31. In a computer system that includes a plurality of threads and a set of objects that each can be synchronized only with a predefined number of said threads at a time, an object synchronization module comprising:
a cache of synchronization constructs, the number of the synchronization constructs being less than the number of the objects;
a free list of each of said synchronization constructs that are not currently allocated; and
a cache manager that (A) removes a respective one of said synchronization constructs from said free list, allocates said respective one of said synchronization constructs to a respective one of said objects, and assigns said respective one of said synchronization constructs to synchronize a respective one of said threads with said respective one of said objects when said respective one of said threads requests synchronization with said respective one of said objects and no others of said synchronization constructs are allocated to said respective one of said objects, and (B) de-allocates said respective one of said synchronization constructs from said respective one of said objects and returns said respective one of said synchronization constructs to said free list when said respective one of said threads requests de-synchronization with said respective one of said objects, said respective one of said synchronization constructs has not been assigned to synchronize any others of said threads with said respective one of said objects and no others of said threads are waiting to synchronize said respective one of said objects;
wherein:
said objects, said threads, and said synchronization constructs are stored in a memory;
said object synchronization module further comprises a synchronization construct cache size controller stored in said memory that (A) when said free list includes more than a first threshold number of said synchronization constructs, removes synchronization constructs from said free list so that said removed synchronization constructs are no longer in said memory and not allocatable by said cache manager, and (B) when said free list includes less than a second threshold number of said synchronization constructs, creates synchronization constructs in said memory that are added to said free list and are allocatable by said cache manager.

32. The object synchronization module of claim 1 wherein:
each of the objects is stored in a memory and has a corresponding memory address;
the object synchronization module includes a hash table data structure for storing pointers to the synchronization constructs that have been allocated to objects, the hash table data structure including a plurality of hash table locations; and
the cache manager allocates the respective synchronization construct from the free list to the respective object by
(A) mapping the memory address of the respective object to a respective portion of the hash table data structure;
(B) inspecting the respective hash table portion to determine whether the hash table data structure contains a pointer to a synchronization construct currently allocated to the respective object; and
(C) when the determination is negative, allocating the respective synchronization construct from the free list and storing a pointer to the allocated synchronization construct in a portion of the hash table data structure corresponding to the respective hash table location.

33. The method of claim 8, wherein:
each of the objects is stored in a memory and has a corresponding memory address;
the method includes providing a hash table data structure for storing pointers to the synchronization constructs that have been allocated to objects, the hash table data structure including a plurality of hash table locations; and
the allocating step includes:
(A) mapping the memory address of the respective object to a respective portion of the hash table data structure;
(B) inspecting the respective hash table portion to determine whether the hash table data structure contains a pointer to a synchronization construct currently allocated to the respective object; and
(C) when the determination is negative, allocating the respective synchronization construct from the free list and storing a pointer to the allocated synchronization construct in a portion of the hash table data structure corresponding to the respective hash table location.

34. The computer program product of claim 15, wherein:
each of the objects is stored in a memory and has a corresponding memory address;
the object synchronization module includes a hash table data structure for storing pointers to the synchronization constructs that have been allocated to objects, the hash table data structure including a plurality of hash table locations; and
the cache manager allocates the respective synchronization construct from the free list to the respective object by
(A) mapping the memory address of the respective object to a respective portion of the hash table data structure;

(B) inspecting the respective hash table portion to determine whether the hash table data structure contains a pointer to a synchronization construct currently allocated to the respective object; and (C) when the determination is negative, allocating the respective synchronization construct from the free list and storing a pointer to the allocated synchronization construct in a portion of the hash table data structure corresponding to the respective hash table location.

35. The object synchronization module of claim 22, wherein:

each of the objects is stored in a memory and has a corresponding memory address;

the object synchronization module includes a hash table data structure for storing pointers to the synchronization constructs that have been allocated to objects, the hash table data structure including a plurality of hash table locations; and the cache manager allocates the respective synchronization construct from the free list to the respective object by (A) mapping the memory address of the respective object to a respective portion of the hash table data structure;

(B) inspecting the respective hash table portion to determine whether the hash table data structure contains a pointer to a synchronization construct currently allocated to the respective object; and (C) when the determination is negative, allocating the respective synchronization construct from the free list and storing a pointer to the allocated synchronization construct in a portion of the hash table data structure corresponding to the respective hash table location.

* * * * *